Figure 1:
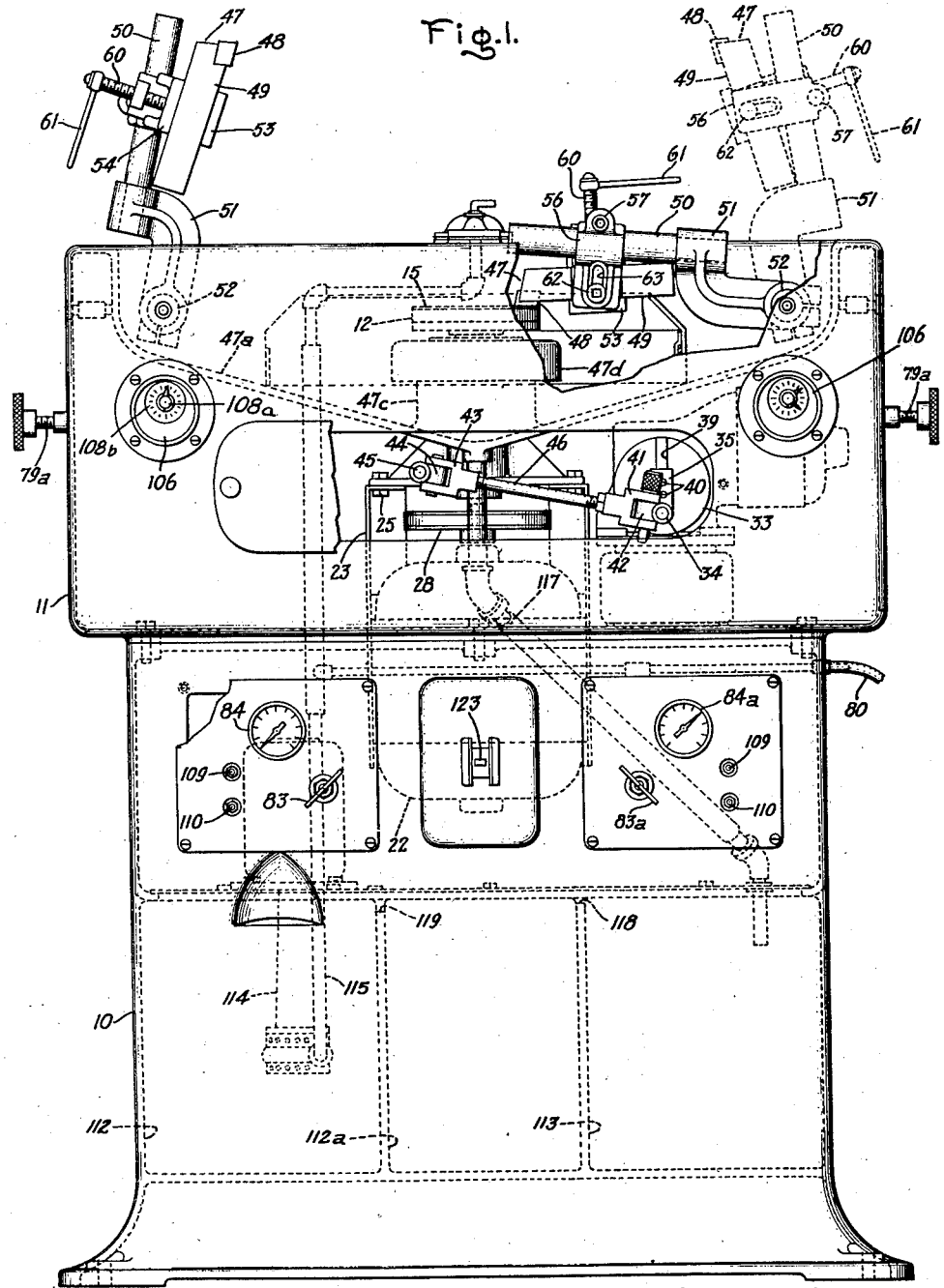

Nov. 12, 1946.  S. A. OAKLEY  2,411,052
GRINDING APPARATUS
Filed Sept. 21, 1943   8 Sheets-Sheet 2

Inventor:
Sterling A. Oakley,
by Harry E. Dunham
His Attorney.

Nov. 12, 1946.        S. A. OAKLEY        2,411,052
GRINDING APPARATUS
Filed Sept. 21, 1943        8 Sheets-Sheet 4

Inventor:
Sterling A. Oakley.
by Harry E. Dunham
His Attorney.

Nov. 12, 1946.     S. A. OAKLEY     2,411,052
GRINDING APPARATUS
Filed Sept. 21, 1943     8 Sheets-Sheet 5
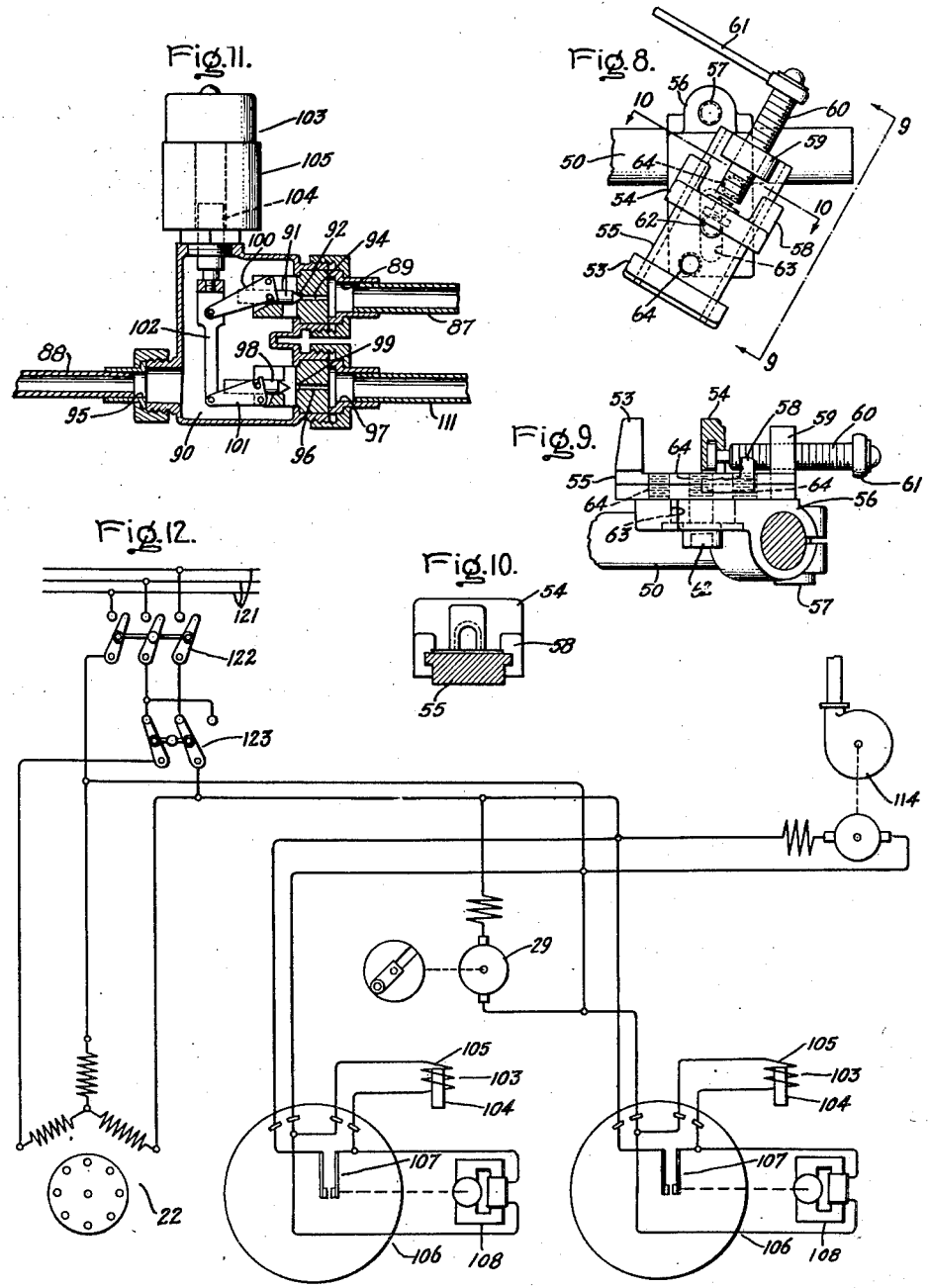
Inventor:
Sterling A. Oakley.
by Harry E. Dunham
His Attorney.

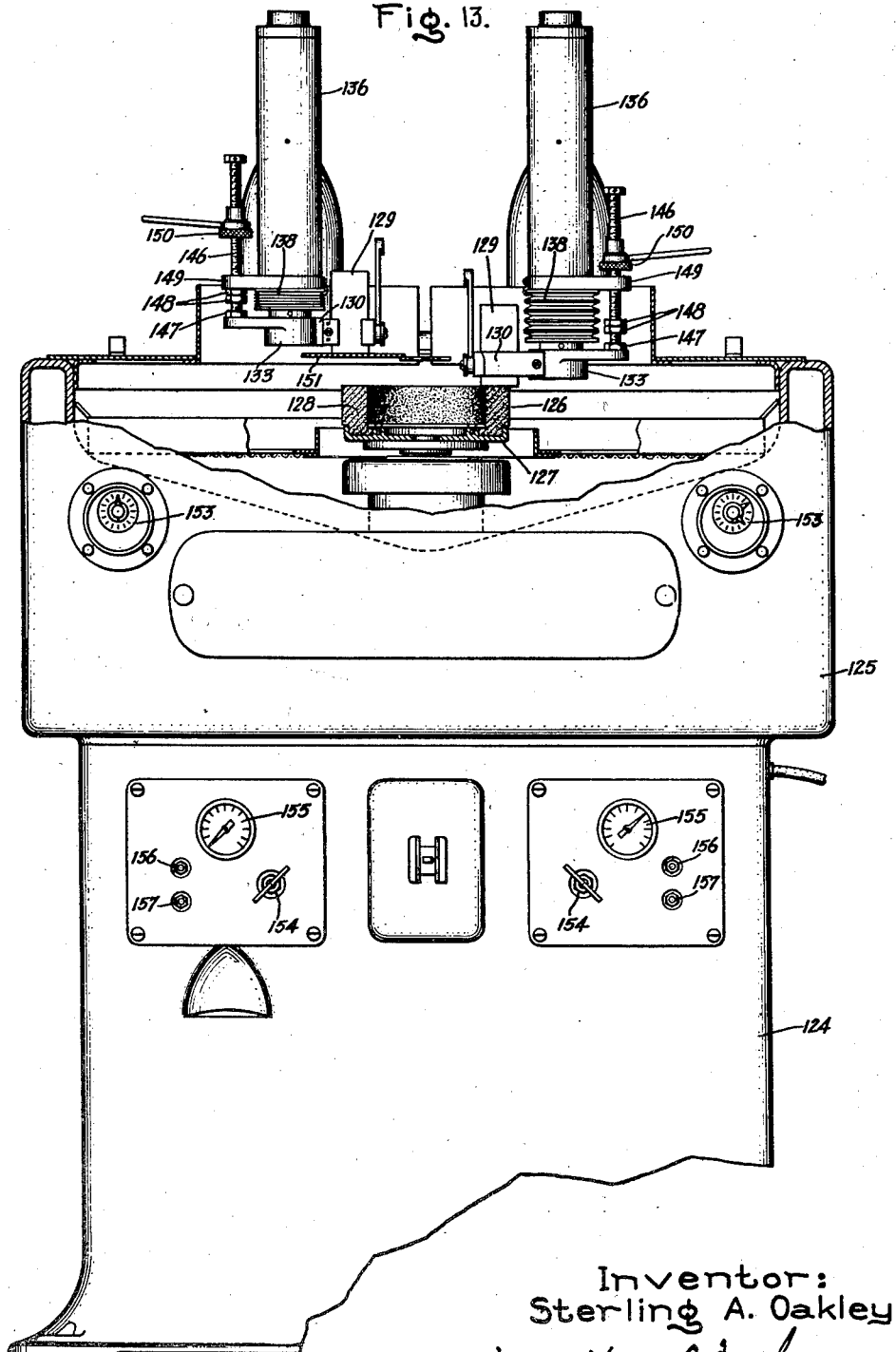

Nov. 12, 1946.    S. A. OAKLEY    2,411,052
GRINDING APPARATUS
Filed Sept. 21, 1943    8 Sheets-Sheet 7

Inventor:
Sterling A. Oakley,
by Harry E. Dunham
His Attorney.

Nov. 12, 1946.  S. A. OAKLEY  2,411,052
GRINDING APPARATUS
Filed Sept. 21, 1943  8 Sheets-Sheet 8
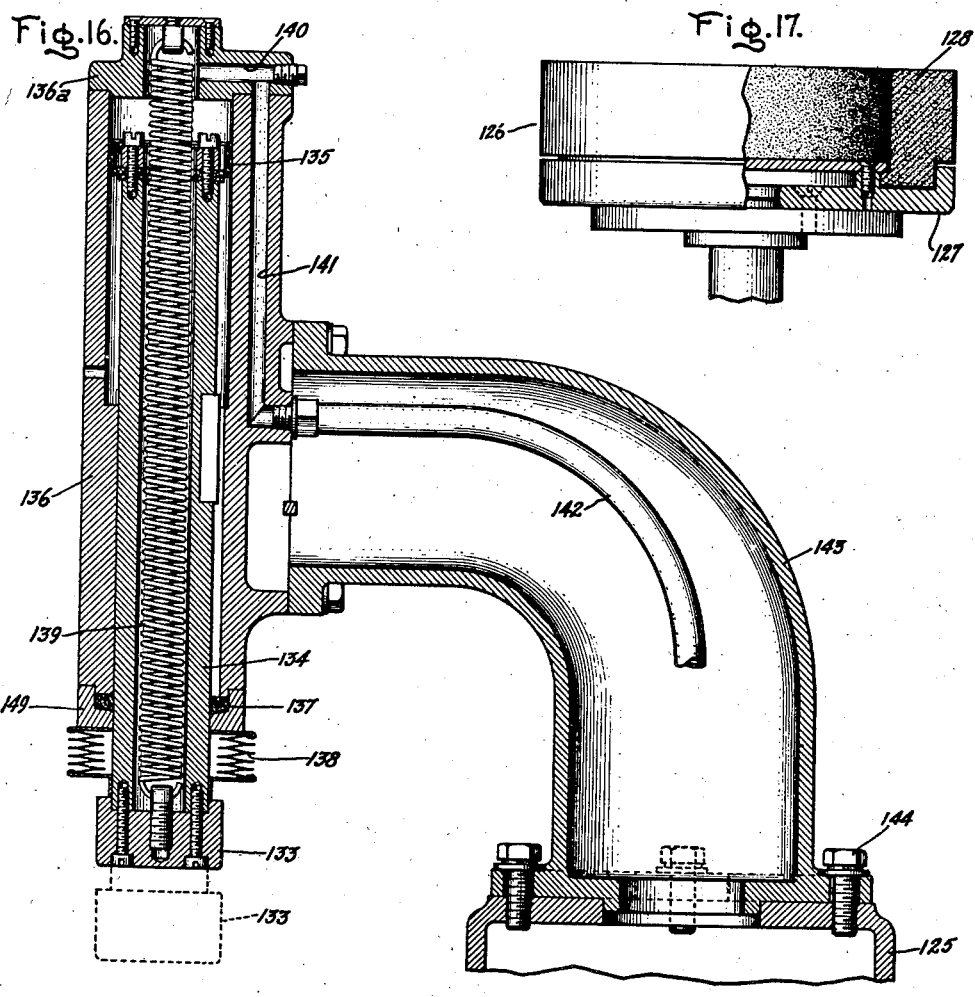
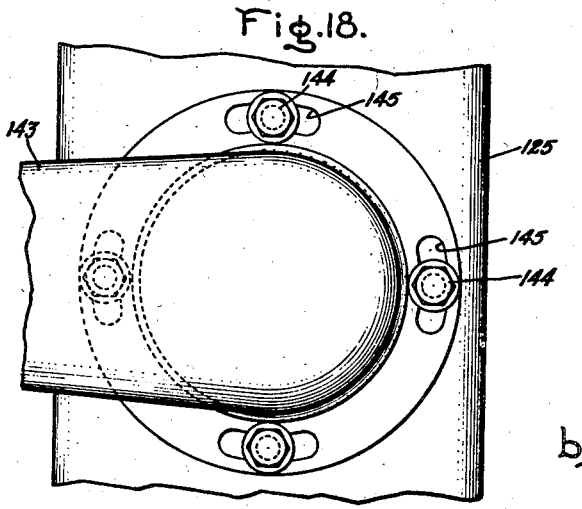
Inventor:
Sterling A. Oakley.
by Harry E. Dunham
His Attorney.

Patented Nov. 12, 1946

2,411,052

UNITED STATES PATENT OFFICE 2,411,052

GRINDING APPARATUS

Sterling A. Oakley, Lincolnwood, Ill., assignor, by mesne assignments, to Ex-Cell-O Corporation, a corporation of Michigan Application September 21, 1943, Serial No. 503,215

7 Claims. (Cl. 51—55)

This invention relates to grinding apparatus, more particularly to apparatus for grinding tools that are formed of extremely hard materials such as tungsten carbide, and it has for its object the provision of improved apparatus of this character.

In the grinding of tools formed of such hard metals sufficient pressure must be applied to the tool on the grinding wheel in order to grind effectively, but not so much pressure that the tool tip will be overheated and thermally cracked; and that the tool be moved across the wheel to avoid localized overheating to distribute wear on the wheel, and to obtain a good finished produce—one entirely free from grinding marks; moreover, it is necessary to grind such tools at much closer angles than is the normal practice with high-speed tool steels if they are to operate at maximum efficiency and also to insure maximum life between grinds.

This invention contemplates to the provision of improved grinding apparatus wherein these requirements are obtained in a simple, reliable and efficient manner.

In accordance with this invention in one form thereof, the grinding apparatus comprises a support upon which a grinding wheel is mounted for rotary motion. Also, mounted on the support is a suitable motor for driving the wheel. A ratio motor is provided to oscillate the support while the grinding wheel is being rotated so that the grinding wheel is given a combined rotary and oscillatory motion with reference to the tool whereby the tool is moved relatively across the wheel as it is being ground.

In addition to this, improved means are provided for holding the tool which is quite flexible so that the tool can be adjusted universally with reference to the wheel whereby it is held in exactly the proper position for grinding.

Furthermore, improved means are provided for controlling the application of the tool to and from the grinding surface of the wheel. The control is such that the tool surface is first applied to the wheel and then the pressure of application of the tool to the wheel is gradually built up to the full grinding pressure. This is done in order to eliminate both mechanical and thermal shocks to the tool. Also when the tool has been ground, the pressure is gradually relieved. This permits the ground surface of the tool "to coast," so to speak, upon the grinding surface of the wheel, whereby it is polished or burnished to remove all irregularities. More specifically, in one form of the invention a pneumatic motor is connected to the tool holder for operating it to the working position wherein the tool is applied to the grinding surface. Suitable biasing means, such as a spring, also is connected to the holder in order to return it to its non-working position. An improved control including valve means is provided for controlling the admission of fluid to and the exhaust of fluid from the fluid motor to control the operation of the tool holder to and from the working position, the control means including fluid flow regulating means, whereby the tool pressure to the wheel initially is gradually built up, and after grinding is gradually released in the afore-mentioned manner.

Also, the fluid is controlled so as to apply to the tool exactly the required full grinding pressure.

In addition, the control includes a suitable time element mechanism which initiates the operation of the fluid motor to move the tool holder to the working position and which holds it in the working position for a predetermined time interval.

Figure 2:
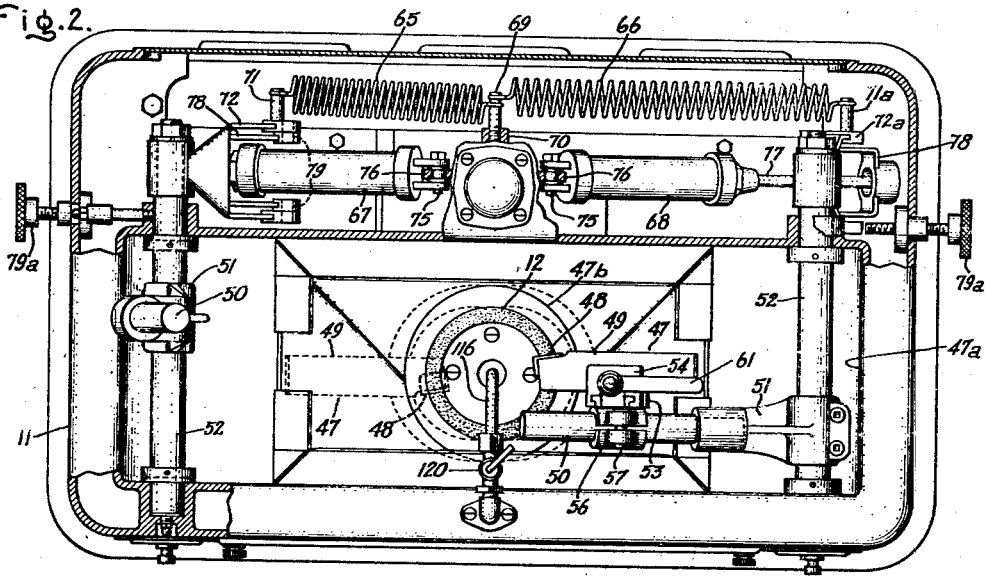
Figure 3:
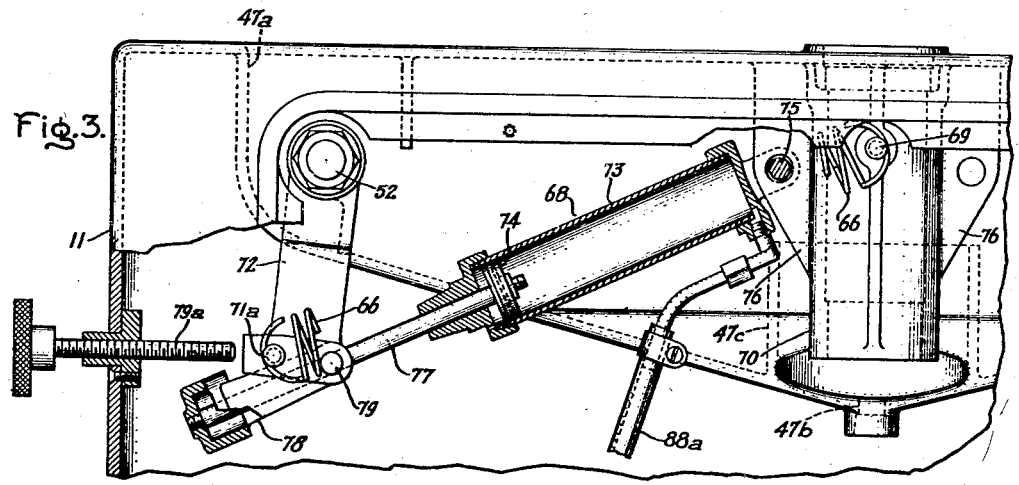
Figure 4:
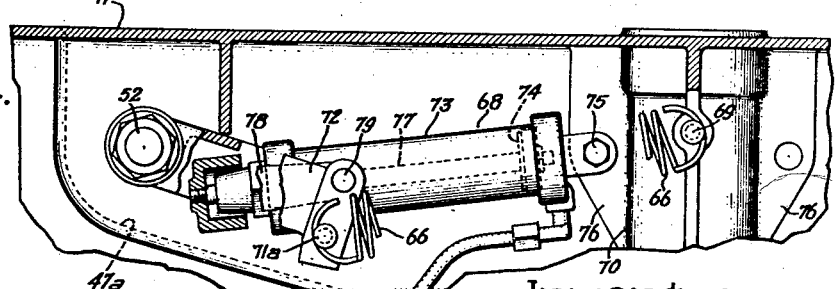
Figure 5:
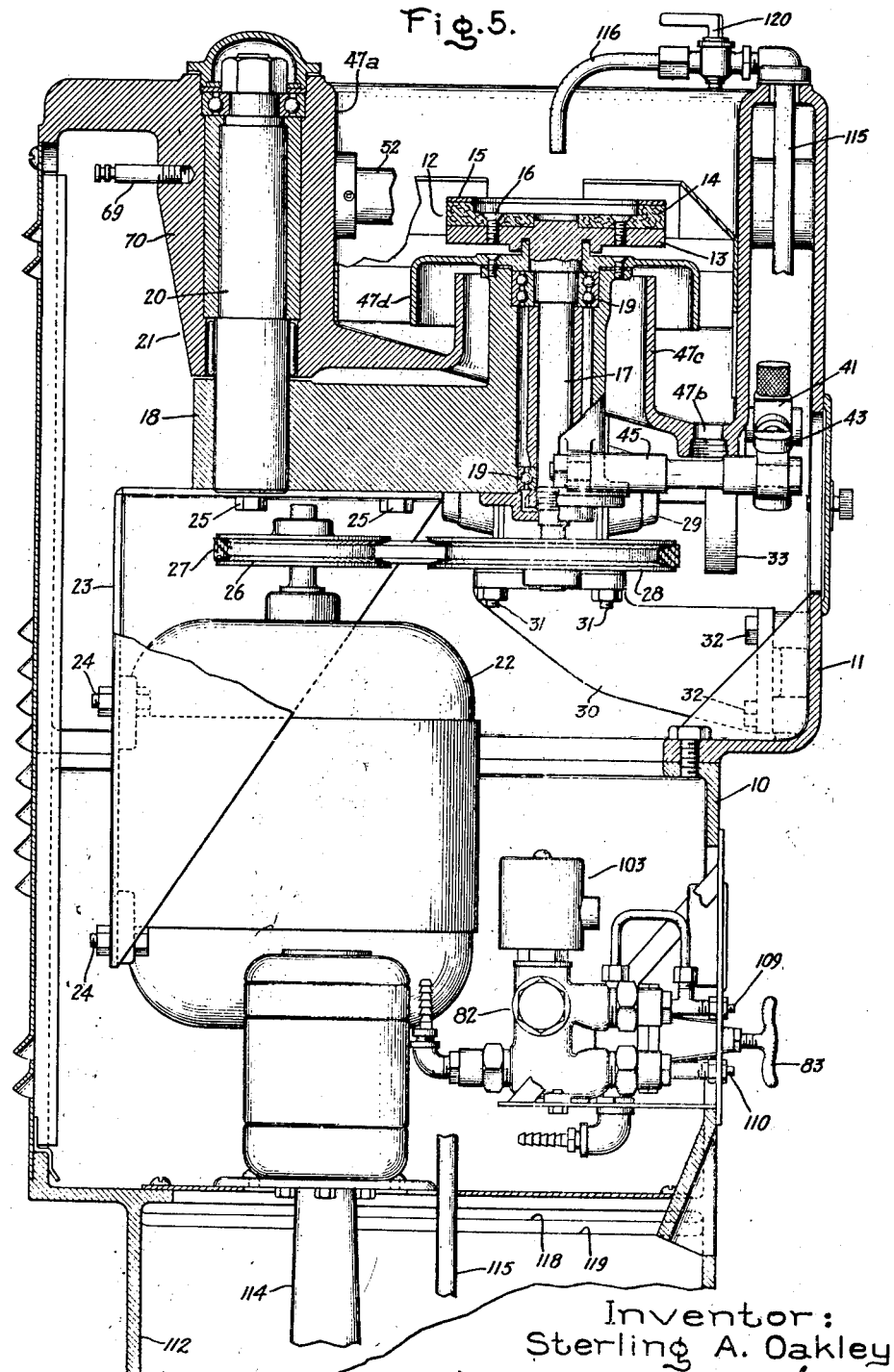
Figure 6:
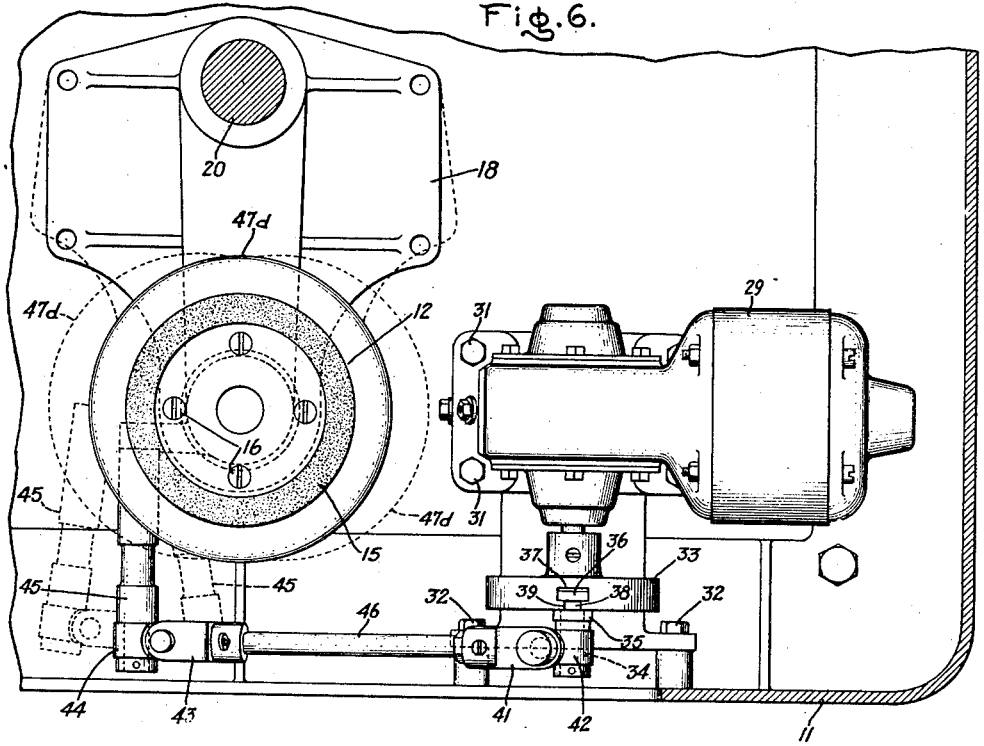
Figure 7:
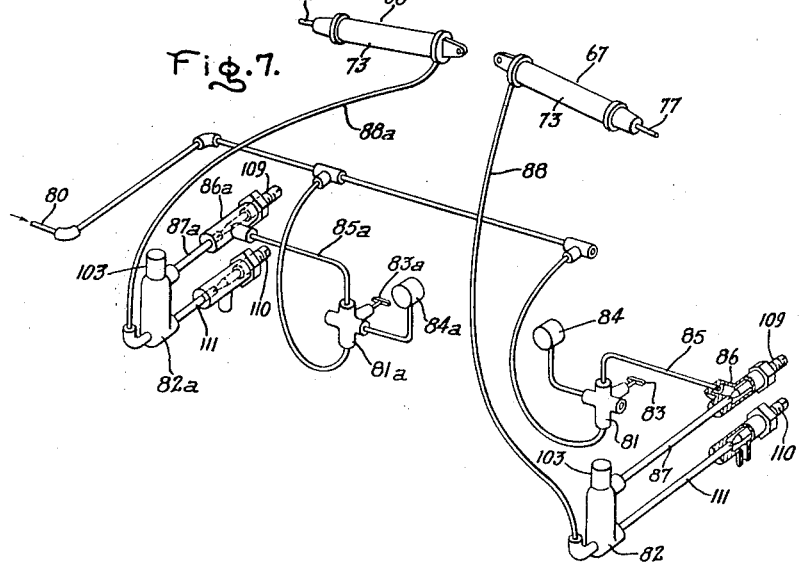
Figure 14:
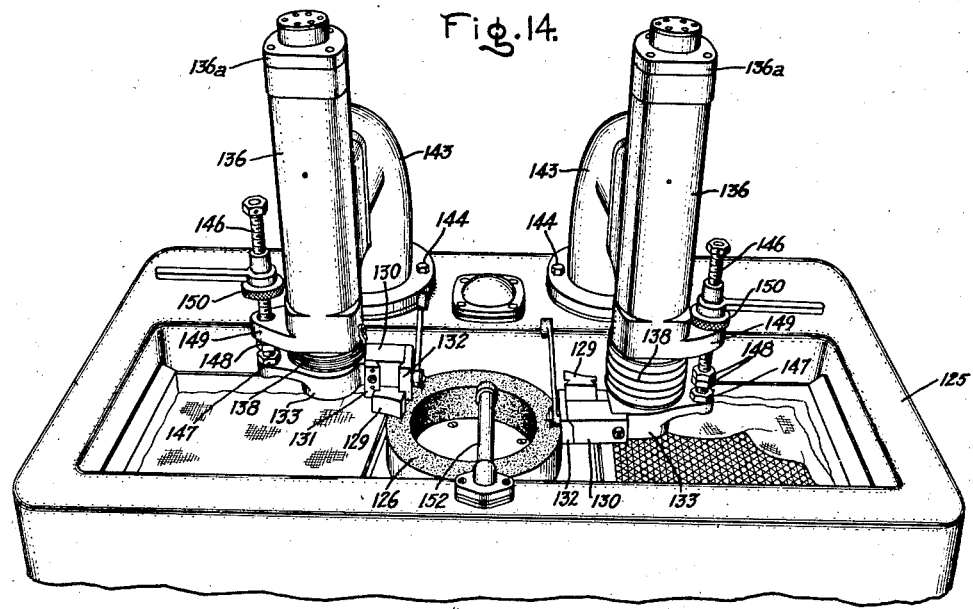
Figure 15:
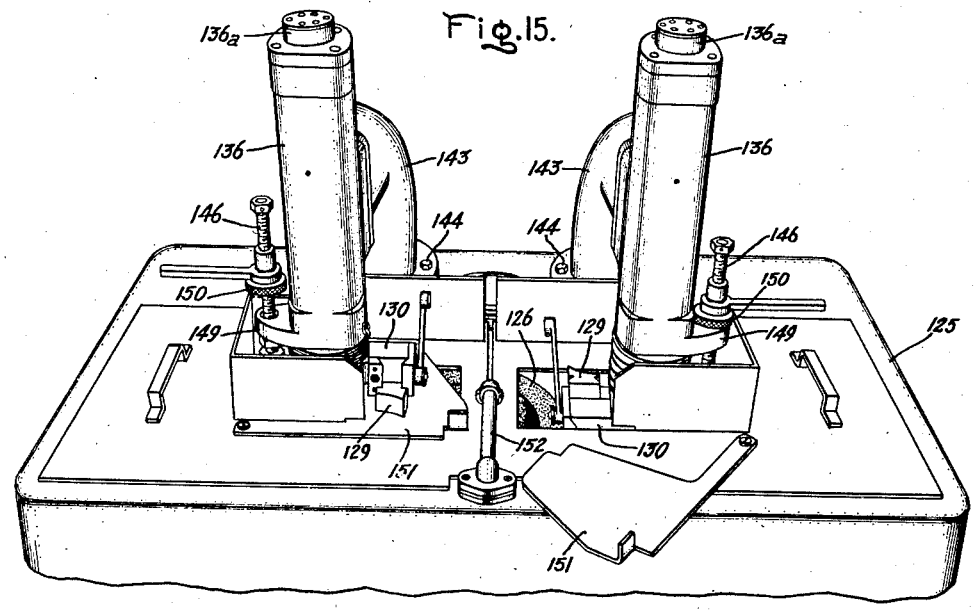

For a more complete understanding of this invention, reference should be had to the accompanying drawings in which Fig. 1 is a front elevation of grinding apparatus embodying this invention, parts being broken away so as to illustrate certain details of construction; Fig. 2 is a top plan view of the apparatus shown in Fig. 1, parts being shown in section so as to illustrate certain details of construction; Fig. 3 is a fragmentary rear elevation view with parts broken away and parts shown in section so as to illustrate certain details of construction, the view being made to a larger scale than Figs. 1 and 2; Fig. 4 is a view similar to Fig. 3 but showing certain elements thereof in different operative positions; Fig. 5 is a vertical sectional view taken through the apparatus of Fig. 1, parts being shown in section so as to illustrate certain details of construction, the view being drawn to a larger scale than Fig. 1; Fig. 6 is a transverse sectional view taken through a portion of the mechanism shown in Fig. 5; Fig. 7 is a perspective diagrammatic view illustrating fluid motors for controlling the operation of the tool holders to and from their working position with reference to the grinding wheel, and certain control mechanism therefor; Fig. 8 is a front elevation illustrating a portion of the tool holder used in this apparatus; Fig. 9 is a view looking at Fig. 8 from the side, as indicated by the line 9—9 of Fig. 8; Fig. 10 is a sectional view taken through the line 10—10 of Fig. 8 and looking in the direction of the arrows; Fig. 11 is an elevation, mainly in section, illustrating a fluid control valve mechanism used in this apparatus; Fig. 12 is a diagrammatic representation showing an electrical control system which is used in the apparatus; Fig. 13 is a front elevation illustrating a modified form of this invention, parts being broken away so as to illustrate certain details of construction; Fig. 14 is a perspective view illustrating the top of the apparatus shown in Fig. 13; Fig. 15 is a view similar to Fig. 14 but illustrating certain auxiliary equipment used with this apparatus; Fig. 16 is a sectional view through a portion of the apparatus shown in Figs. 14 and 15, the view being drawn to a larger scale than Figs. 14 and 15; Fig. 17 is an elevation, partly in section, illustrating the construction of the grinding wheel used in the apparatus of Figs. 14 and 15; and Fig. 18 is a fragmentary plan view of the portion of the apparatus shown in Fig. 16.

Referring more particularly to the apparatus shown in Figs. 1–12 inclusive, this invention has been shown in one form as applied to grinding apparatus comprising a base 10 and an upper housing section 11 mounted upon the base.

Mounted within the upper section 11 is a grinding wheel 12. This wheel 12, as shown, comprises a disk-like base 13 (Fig. 5). Mounted upon the disk is a shallow, cup-shaped, circular member 14 formed of a suitable material, such as plastic, and mounted upon the top wall of this member is a layer of a suitable abrasive grinding material 15 such as a resonoid bond diamond. This material will be bonded to the member 14 in any suitable way; and the member 14 is secured to the disk 13 in any suitable way as by screw fastening means 16.

The disk 13 is mounted upon and integrally secured to a vertically positioned driving shaft 17 which is journaled in a suitable relatively massive support 18 by means of bearings 19.

The support 18 in its turn is mounted upon and secured to a shaft 20 which is journaled in a section 21 of the top 11. The support 18 is supported in this fashion so that it may be oscillated for a purpose which will be described in greater detail hereinafter.

Also, mounted upon the support 18 is a driving motor 22 which preferably will be any suitable electric motor; as shown, the motor 22 is secured directly to a frame 23 by means of bolts 24, and this frame in turn is secured to the bottom surface of the support 18 by means of bolts 25. This motor 22 drives a pulley 26 which through a belt 27 drives a pulley 28 secured to the lower end of the grinding wheel shaft 17.

It will be observed in view of the foregoing, that the motor and grinding wheel are mounted upon the oscillating support 18 so that both oscillate with it, and also that the motor 22 has a driving connection with the grinding wheel through the belt 27.

Oscillatory motion is imparted to the support 18, while the grinding wheel is being rotated by the motor 22, by means of a ratio motor 29, this motor is mounted upon a bracket 30 by means of bolts 31, and the bracket is rigidly secured to the upper frame member 11 by means of bolts 32. The ratio motor 29 drives a disk-like crank member 33 (Figs. 1, 5 and 6) which rotates a crank pin 34. The crank pin 34 is mounted upon a slide member 35 which moves on the front face of the disk member across a diameter thereof, and which is secured to an anchor plate 36 that slides in a channel 37 extending diametrically across the disk 33. The member 36 has a small section 38 along its length which slides in a reduced slot 39 between the channel 37 and the outer surface of the disk. The plate 35 is secured directly to the reduced section 38 by means of screws 40 (Fig. 1). It will be observed that by reason of this arrangement the screws 40 function to clamp the crank pin 34 to the disk 33, and also that when they are loosened the plate 35 together with the crank pin 34 can be adjusted across the diameter of the disk, whereby the radius of rotation of the pin 34 may be changed.

Crank pin 34 is mechanically connected with the support 18 by a pair of universal joint members including a fork 41 rotatably mounted on a member 42 that rotates on the crank pin 34, and a fork 43 pivoted to a member 44 which rotates upon a rod 45. It will be observed that the two fork members 41 and 43 are pivoted to move with reference to the members 42 and 44 respectively on axes at right angles to the axes of rotation of the members 42 and 44 with reference to the crank pin 34 and the rod 45 respectively. The nexus of the two fork members 41 and 43 are rigidly secured together by means of a rod 46, and the rod 45 is rigidly secured to the support 18. It will be observed in view of the foregoing construction that when the motor 29 operates the crank disk 33, the frame 18 will be given an oscillatory motion, the limits of the motion depending upon the radial position of the crank pin 34. Such an oscillatory motion is indicated by the dotted lines of Fig. 6, which indicate the extreme positions of the rod 45, and the limits of oscillation of the grinding wheel, as it is oscillated by the frame 18, for a given crank pin setting.

In other words, the two motors 22 and 29 function to give the grinding wheel a combined rotary and oscillatory motion which is used to move the grinding tool 47 relatively across the grinding surface 15 as the tool is being ground.

The grinding wheel 14 rotates within a basin 47a which is utilized to collect a grinding coolant, as will be pointed out hereinafter. The basin 47a is formed by walls formed integrally with the upper section 11 as clearly shown, the bottom wall thereof tapering downwardly to a drain opening 47b. This bottom wall is provided with a reentrant section 47c surrounding the section of the support 18 in which the shaft 17 is journaled, this reentrant section being sufficiently large to provide for the maximum oscillatory motion required by the frame 18. This reentrant section is covered by a top wall 47d which is secured to the frame 18.

The specific grinding tool 47 illustrated comprises a cutting member 48 formed of an extremely hard material, such as tungsten carbide, and which is mounted upon a base 49.

The apparatus illustrated is adapted to support a pair of these tools 47, as shown in full and dotted lines in Figs. 1 and 2, whereby the pair may be ground simultaneously.

Suitable means are provided for holding and for controlling the motion of the tools 47 between working and non-working positions with reference to the grinding wheel, the left-hand tool 47 of Fig. 1 being shown in its non-working position, and the right-hand tool 47 of Fig. 1 being shown in its working position with reference to the wheel, the non-working position of the latter tool being shown in dotted lines in Fig. 1.

The tool holders for the two tools are identical in construction, comprising cylindrical pin-like members 50 which are rigidly mounted in brackets 51, which in turn are rigidly secured to operating shafts 52 extending across the top member 11 in parallel relation with each other and having their two opposite ends journaled to rotate in the frame 11. The base 49 of each tool 47 is gripped by a pair of cooperating jaw members 53 and 54 which are shown more clearly in Figs. 8, 9 and 10. The jaw member 53 is mounted upon a base 55 which in turn is rigidly secured to a split collar 56 which is mounted upon the rod 50 and clamped thereto by means of a releaseable screw 57 in a well-known manner. The jaw member 54 has a base 58 which rides upon the base 55 of jaw member 53, the base 55 having roughly a T-shape shown in Fig. 10, and the member 58 having sections clamping the head of the T as there shown. The base 55 of jaw member 53 further is provided with an extension 59 parallel to the jaw 53 and in which is threaded an adjusting screw 60. This screw at its inner end has an enlarged head which fits into a recess provided for it in the jaw 54. By reason of this arrangement, it will be understood that the jaw 54 can be adjusted relatively to the jaw 53, whereby the tool base 49 can be clamped rigidly to the rod 50 or released therefrom. Attached to the outer end of the screw 60 is a crank arm 61 which is used to adjust the position of the jaw 54.

It will be understood that by means of the split collar 56 the two jaws 53 and 54 as a unit can be adjusted upon the rod 50 to adjust the angular position of the tool 47 relative to this rod. In addition to this, the base 55 carrying the two jaws 53 and 54 is adjustable in the direction of the axis of the screw 60, and for this purpose the base 55 is secured to the split collar 56 by means of a bolt 62 which extends through an elongated slot 63 provided for it in the collar member 56, and which may be threaded into any one of a plurality of spaced apart tapped holes 64 provided for it in the base 55, it being understood that when the bolt is loosened the axial position of the jaws can be changed. Furthermore, the jaws can be adjusted to any position within the confines of the slot 63. In addition to all of this, the bolt may be received in any one of the three tapped holes 64. In view of all of the foregoing, it will be observed that the tool holder is adjustable universally so that the cutting surface member 48 can be brought into any desired angular relation with reference to the plane of the grinding surface 15.

Suitable means are provided for holding the tools in their non-working positions and for operating them to their working positions, this means comprising a pair of tension springs 65 and 66 for the two tools respectively which function to bias the two tools to their non-working positions, and a pair of pneumatic motors 67 and 68 respectively for operating the tools to their working positions against the forces of the biasing springs.

As shown more clearly in Figs. 2 and 3, the inner adjacent ends of the springs 65 and 66 are anchored to a pin 69 which in turn is mounted upon a column 70 which is a part of the upper section 11 and positioned to the rear of the basin 47a. The outer ends of the springs are secured to pins 71 and 71a. These pins in turn are each connected to one leg of U-shaped members 72 and 72a respectively which members are rigidly secured to the two respective shafts 52. It will be observed that by reason of this arrangement, the tension springs function to bias the tool holders to their non-working positions.

Each of the fluid motors 67 and 68 comprises a cylinder 73 in which operates a piston 74. One end of each of the cylinders is pivotally mounted upon a pin 75 that is supported in a flange 76 extending outwardly from the column 70. The piston rod 77 of each piston extends from the other end of the cylinder 73 and it is rigidly secured to the nexus of a second U-shaped member 78. The outer extremities of the two legs of the two U-shaped members 78 are pivoted to the extremities of the two U-shaped members 72 and 72a respectively by means of pins 79.

It will be observed, therefore, that when either of the pistons 74 is moved outwardly in its cylinder 73 away from the pivoted end of the cylinder it will operate the shaft 52 associated therewith through the medium of the two forks 78, and 72 or 72a, to force the associated tool into its working position with relation to the grinding wheel against the force of the associated biasing springs 65 and 66.

Suitable adjustable stops 79a are mounted in opposite sides of the top 11 for engaging the forks 72 and 72a respectively so as to limit the movement of the tools by the fluid motors. These are adjusted to determine the degree of grinding permitted.

Suitable means are provided for controlling the flow of fluid into the cylinder and the exhaust of the fluid therefrom in order to control the application of the tool to and from the surface of the grinding wheel, the fluid control systems for each of the motors 67 and 68 being identical. The control means is shown more clearly in Figs. 7 and 11. A single source of fluid supply 80, such as compressed air, is provided for both fluid motors 67 and 68. The fluid pressure for the motors is controlled by means of pressure regulators 81 and 81a and fluid control valves 82 and 82a, the pressure regulators 81 and 81a being of any suitable well-known type which will hold a constant adjusted pressure on its outlet side and which pressure may be manually adjustable by a control member 83, 83a accessible at the front of the machine. The pressure on the outlet side is measured by pressure gages 84 and 84a. The fluid delivered by the pressure regulators 81 and 81a is fed through pipes 85 and 85a, T-junctions 86 and 86a, and pipes 87 and 87a to the two valve structures 82 and 82a respectively; and from these valves, the fluid is fed through pipes 88 and 88a respectively to the inner ends of the two motor cylinders 73 respectively.

Thus, it will be observed that adjustable pressures are fed by the two pipes 87 and 87a to the valve mechanisms 82 and 82a. These mechanisms are identical, and the mechanism 82 only is shown in Fig. 11. The fluid fed by the pipe 87 enters through an opening 89 into a valve chamber 90. The flow of fluid into the chamber 90 is controlled by a valve 91 which coacts with a seat 92 of a passageway 94 communicating with the inlet opening 89. The valve chamber 90 is connected with the inner end of the associated fluid motor cylinder 67 through the pipe 88 which is connected with an opening 95 of the valve. It will be observed that if the valve 91 be opened the fluid may flow through the passageway 94 and thence through the valve chamber 90 and the opening 95 to the inner end of the cylinder in order to operate the piston therein outwardly and thereby move the tool into working engagement with the grinding wheel. The tool will be held against the grinding wheel as long as the fluid pressure is supplied. In order to release the tool, the air is exhausted from the cylinder, and for this purpose the valve is provided with an exhaust passageway 96 communicating with an exhaust opening 97. The passageway 96 is controlled by a valve 98 which coacts with a valve seat 99. Therefore, when the valve 91 is returned to its closed position and the valve 98 opened, the fluid in the cylinder can exhaust freely out of the opening 97, thereby permitting the tension spring 65, to return the tool to its non-working position.

The two valves 91 and 98 are operated by levers 100 and 101 which are mechanically interconnected by means of a rod 102 whereby they are operated in unison—one being moved to its open position while the other is being moved to its closed position.

The valve operating rod 102 is controlled by means of an electromagnetic operating device 103 having an armature 104 and a winding 105. When the magnet is deenergized the valves occupy their position shown in Fig. 11, that is, the inlet valve 91 is closed and the exhaust valve 98 is open. However, when the magnet is energized, the armature 104 is moved upwardly, as viewed in Fig. 11, and as a result thereof the link 102 is moved to open the inlet valve 91 and to close the exhaust valve 98.

The energization of each of the electromagnets 103 is controlled by a suitable time element mechanism 106 (Figs. 1 and 12). Each of these mechanisms includes a suitable control switch 107 and a suitable electric motor 108 operating on a time cycle. Any suitable well-known timing device of this nature may be used, it being understood that when the timer is set for a certain time interval that the switch 107 will be closed and the motor 108 energized to open it a predetermined interval of time thereafter. The timers are provided with the usual standard handset dial knobs 108a having pointers which are set against suitable time scale dials 108b. The switch 107 controls the electromagnet 103; thus, when the timer is set to measure a predetermined interval of time the electromagnet 103 will be reenergized to admit air to the tool operating cylinder and it will function to hold the tool in contact with the grinding wheel through the interval of time set by the timer.

It is desirable to control the rate at which the contact or grinding pressure is built up between the tool and wheel, and also the rate at which this pressure is reduced at the end of the grinding period. As mentioned above, it is desirable to gradually increase the rate at which the grinding pressure is built up in order to eliminate mechanical shock to the tool, and also to avoid thermal shock thereto. With very hard tools, such as devices formed of tungsten carbide, the relatively light initial grinding pressure will first eliminate sharp or jagged edges before the main grinding operation takes place. If the tools were applied with full grinding pressure initially the tool would be subjected to severe mechanical shock and possible damage when these edges engage the grinding surface. Also if the full grinding pressures were suddenly applied, the tool tip quite likely would become overheated and thermally cracked or otherwise thermally weakened. It is desirable to gradually reduce the grinding pressure at the end of the grinding interval after the electromagnets 103 are deenergized in order to permit the tool to coast upon the wheel and thereby give it a burnishing or polishing action so that all irregularities are taken off. In order to control the build up of the grinding pressure, adjustable needle valves 109 are provided for controlling the pressure built up in the feed pipes 87 and 87a to the two valves 82 and 82a respectively. These valves will be set in order to cause the pressure to build up at the desired rate. The rate of reduction of the grinding pressure at the end of the grinding operation is controlled by means of exhaust needle valves 110 which control the rate of exhaust from the exhaust pipe 111.

It will be understood, therefore, that when these valves are properly set and the valve mechanisms 82 and 82a are operated to permit air to flow to the pneumatic cylinders 67 and 68 that the air pressure will gradually build up and overcome the spring pressure and cause the tool holder to carry the tool against the grinding wheel. When the tool contacts it, of course, cannot move farther and then the air pressure builds up to the full grinding pressure at a gradual rate as determined by the settings of the needle valves 109. At the conclusion of the grinding operation when the electromagnets 103 are deenergized to open the exhaust valves 98 the air exhausts at a gradual rate as determined by the settings of the valves 110 so as to permit the tools to coast in the manner described. Thus, when the exhaust valves 98 are opened, the air from the cylinders 67 and 68 bleeds the pressure down slowly to permit the burnishing action, and eventually to such a low value that the springs 65 and 66 can return the tool to its non-working position.

Also the valves 109 and 110 control the speeds with which the tool is moved to and from the grinding wheel.

It should be noted here that the springs 65 and 66 not only function to move the tools to their non-working positions, but they also act as shock absorbers to smooth out any irregularities or vibration in the movement of the tools to and from the grinding wheel. This steady motion is highly desirable in that it eliminates chatter and thus gives a smooth grinding operation.

Also the combination of the air operated motors and spring return for the tools yield during the grinding operations so that the tool holders will accommodate themselves to slight variations in alignment of the grinding wheel and thus prolong the wheel life by permitting it to wear away at a more uniform rate.

It will be observed from Fig. 1 that the timing devices 106 and the two sets of needle valves 109 and 110 are accessible at the front of the machine whereby they may be conveniently set and adjusted.

A suitable coolant is continuously supplied to the grinding wheel during the grinding operation. In the specific example illustrated, the coolant is water. The water is forced from three settling tanks 112, 112a and 113 by means of a motor driven pump 114 through a pipe 115 to a discharge spout 116. The discharge spout 116 discharges the water directly into the center of the grinding wheel and from there it is forced outwardly in all directions over the surface of the wheel by centrifugal force, the water being forced to flow outwardly over the grinding surface 15. The water which is flung out from the wheel is collected in the basin 47a and discharges from the opening 47b into a drain pipe 117 which discharges into the settling tank 113. From there, the water passes through an overflow 118 into the middle tank 112a and from there through an overflow 119 into the tank 112. In this way there is a continuous circulation of coolant onto the grinding wheel. The settling tanks, of course, function to collect and drain off the sludge. The rate of flow of the water to the grinding wheel is controlled by means of a valve 120.

The driving motor 22 for the grinding wheel 12, the ratio motor 29 which oscillates the frame 18, and the motor driven pump 114, as well as the electromagnets 103 and the timers 106, all are electrically supplied from a suitable electrical source 121. A master switch 122 controls the connection and disconnection of these elements to and from the supply source. In addition, a reversing switch 123 is provided for the motor 22 so that the grinding wheel may be reversed for grinding either left or right hand tools.

In the operation of this form of the invention, the tool base 49 will be clamped between the jaws 53 and 54 and these jaws will be attached to the rod 50 in their proper position. Then the master switch 122 may be shut, which operation will start the motors 22 and 29 and also will start the electrically driven coolant pump. Then the pressure regulators 83 and 83a will be set to the desired pressure which will be read upon the gages 84, 84a, and then the clocks 106 will be set to the desired time intervals by means of pointers 108a. Once these are set, the electromagnets 103 will be energized so as to admit fluid pressure to the operating motors 67 and 68 and the tools will be forced into engagement with the grinding wheel and will be held against the wheel for the intervals of time set by the timers. When the time intervals have elapsed the electromagnets will be deenergized and the tools will be returned by the springs to their non-working positions. Of course, prior to the starting of the grinding operation the needle valves 109 and 110 will have been adjusted so as to control the speeds of application of the tools to the grinding wheel and their return movement to their non-working positions, and the rates at which the grinding pressure is built up, and reduced, as fully described above.

It will be understood, of course, that the control mechanisms for the two tools are entirely independent in the sense that one may be operated independently of the other, and each may be set independently of the other for its own time period, and also for the speeds with which the tool is moved to and from the grinding wheel, and for the pressure rates.

In the second form of the invention shown in Figs. 13–18 inclusive, there is provided a different tool holding mechanism. Otherwise, the apparatus of this form is substantially the same as the first form. Thus, it comprises a base 124 and a top section 125 within which the grinding wheel 126 is mounted to operate. The grinding wheel is rotated and oscillated by mechanism which is identically the same as in the first form. Here, however, the wheel has a somewhat different construction, the wheel being provided with a metallic supporting base 127 upon which is mounted a relatively high cylindrical grinding member 128, which in this specific example illustrated, is formed of a suitable vitreous cutting abrasive material.

The forming or shaping tools to be ground are indicated by the numerals 129 and they are supported by means of suitable holders comprising a base 130 on which jaw members 131 and 132 are mounted. The two jaws form a dovetail socket, as shown more clearly in Figs. 14 and 15, and the tool is provided with a complementary dovetail section which is arranged to be clamped between the jaws. When it is desired to clamp the tool, its dovetail section is fitted to the base 130 and the jaw 132 tightened so as to rigidly clamp the tool to the base.

The tool base 130 is attached to a supporting member 133 which, as shown more clearly in Fig. 16, is secured to the lower end of a piston cylinder 134 to the upper end of which a piston 135 is secured. The piston and piston cylinder operate in a motor cylinder 136. At the lower end of the cylinder 136, a suitable packing 137 is provided for effecting a fluid-tight sliding joint between the two cylinders; and at this end there is also provided an expansible and contractible shield 138 attached to the lower ends of the two cylinders and which expands and contracts as they move relatively to each other. This shield keeps dirt and other foreign materials from contacting the exposed surface of the inner cylinder 134.

The inner cylinder 134 is biased upwardly by means of an elongated tension spring 139 which at its lower end is anchored to the support 133 and at its upper end is anchored to the upper cylinder head 136a of the cylinder 136, as shown. This spring functions, as do the springs 65 and 66 of the first form of this invention, to hold the tool in its upper non-working position. The tool is forced to its working position by means of fluid pressure which is admitted to the upper end of the cylinder 136. For this purpose, the cylinder head is provided with a fluid passageway 140 which communicates with a passageway 141 in the side wall cylinder 136, and which passageway in turn communicates with a fluid passageway 142. The fluid flow in the passageway 142 is controlled by means of fluid pressure regulation and valve means in precisely the same way that fluid flow in the pipes 88 and 88a of the first form is controlled.

The cylinder 136 and the associated mechanism are supported by a hollow elbow 143 which is mounted upon the upper frame 125 and secured thereto by bolts 144. The elbow 143 is axially adjustable with reference to the frame 125 to a limited extent, and for this purpose it is provided with elongated slots 145 through which the bolts 144 are directed. This is for the purpose of providing an adjustment between the position of the tool and the grinding wheel.

Suitable means are provided for positioning the tools 129 initially so that just the proper amount will be removed in the grinding operation. For this purpose, a screw 146 is threaded into the member 133, and is secured thereto by means of a nut 147. Also threaded on this screw are a pair of nuts 148 which are set to determine the upper or non-working position of the tool holder. The upper of these nuts bears against an abutment 149 fixed to the cylinder 136 when the tool is in its upper non-working position. Threaded upon the screw 146 above the abutment is an adjustable nut 150 which limits the downward stroke of the piston 135. In addition, the setting means includes pivotally-mounted gage plates 151. When the tools are to be set into the apparatus the gage plates are moved inwardly, as is the left-hand one shown in Fig. 15, and with the nuts 148 against the abutment 149 the tool 129 is inserted between its jaws so that its lower end rests on the gage plate 151. Then the jaws are tightened. This sets the tool initially and the amount that will be ground will be determined by the extent of movement downwardly permitted by the nut 150. When the proper amount has been ground off the nut 150 will engage the upper side of the abutment 149 which will limit any further downward movement of the tool. It will be understood, of course, that after the tools have been set initially the gage plates 151 will be removed from the path of movement of the tool before grinding takes place. The right-hand plate 151 of Fig. 15 is shown in its removed position.

Coolant is supplied to the center of the grinding wheel by means of a spout 152.

In substantially all other respects the machine is identically the same as the first form; and as shown in Fig. 13 it is provided with timers 153 to control the length of the grinding operations, with pressure regulators having controls 154, with pressure gages 155 which indicate the amount of pressure applied, and with sets of valves 156 and 157 which determine the speeds of application of the tool to the grinding wheel and the return thereof from the wheel.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. In a tool grinding machine for grinding a metallic tool, a tool holder for the tool, a grinding wheel having a grinding surface, means for rotating said grinding wheel, mounting means for supporting said tool holder for movement from a non-working position remote from said wheel to a working position with reference to said wheel, said holder when in said working position holding the tool in abutting grinding contact with said grinding surface, an aeriform fluid motor connected to said tool holder for operating it to and holding it in said working position, means for conducting aeriform fluid under pressure to said motor to operate it to move said tool holder to said working position and for holding it therein, pressure regulating means controlling said fluid under pressure so that said motor gradually builds up the pressure forcing said tool against said grinding surface to a full grinding valve thereby obviating mechanical and thermal shocks to said tool, means for shutting off the supply of said fluid to said motor, means for returning said tool holder to said non-working position, and pressure release means controlling the exhaust of the fluid from said motor to gradually release the pressure between said tool and said wheel so as to give said wheel a final polishing treatment.

2. In grinding apparatus, a grinding wheel and a tool holder for holding a tool against said wheel comprising a rod, a support on said rod universally adjustable to any angular position circumferentially around said rod, a base on said support, said base having a plurality of apertures spaced apart along an axis thereof, a pin-like member carried by said support selectively insertable in said apertures to adjust the position of said base with reference to said support in a direction along said axis, said base further being rotatably adjustable on said pin-like member, means for securing said base to said pin-like member, said support further having an aperture therein elongated in a direction at right angles to said rod through which said pin-like member is directed for insertion in said apertures whereby said pin-like member and attached base can be adjusted toward and away from said rod on said support, and clamping means on said base for holding said tool.

3. In grinding apparatus, a grinding wheel, a tool holder, means mounting said holder for movement toward and away from said wheel along an axis substantially perpendicular to the plane of the grinding surface of said wheel, means for moving said tool holder between non-working and working positions with relation to said grinding wheel, stop means for determining said non-working position, a gage plate movable to a position between said tool holder when it is in its non-working position and said grinding wheel for determining the initial position of the tool surface to be ground, and movable away from said position to order to permit said tool holder to be moved to its working position with relation to said grinding wheel, and stop means for controlling the extent of movement of said holder toward said wheel to determine the degree of grinding permitted.

4. In a tool grinding machine for grinding a metallic tool, a tool holder for the tool, a grinding wheel, means for rotating said grinding wheel having a grinding surface, mounting means supporting said tool holder for movement from a non-working position remote from said grinding wheel to a working position with reference to said wheel, said holder when in said working position holding the tool in abutting grinding relation with the wheel, a spring connected to said tool holder biasing it to said non-working position, an aeriform fluid motor having a cylinder and a piston therein, means connecting said piston to said tool holder, a control valve for controlling the admission of aeriform fluid under pressure to one end of said cylinder and the aeriform fluid when admitted to said one end forcing said piston toward the other end of the cylinder in order to force said tool holder to its working position with reference to said grinding wheel against the force of said spring, and to hold the tool in abutting relation with said grinding surface, means for regulating the flow of aeriform fluid to said one end to control the rate of build up of the full grinding contact pressure between the tool and the wheel so as to obviate mechanical and thermal shocks to said tool, said valve also controlling the exhaust of the fluid from said one end in order to permit said spring to return said holder to said non-working position, and means for regulating the rate of exhaust of fluid from said one end in order to control the rate at which said pressure is reduced to give said tool a final polishing treatment.

5. In a grinding machine, a disk-like grinding wheel, means for rotating said wheel, a tool holder, means mounting said holder for movement from a non-working position remote from said wheel to a working position with relation to said wheel in which position the tool is in abutting grinding relation with one side of said wheel, means biasing said tool holder to said non-working position, an air motor having an element movable by air under pressure and connected to said holder for operating it to said working position to hold the tool against said one side of said wheel, air control means controlling the admission of air under pressure to said motor to operate said element so that it forces said tool against said one side with a gradually increasing force until the full grinding pressure is attained and for controlling the exhaust of the air from said motor in order to cause said grinding pressure to gradually recede and thereby permit said biasing means to move said tool holder to said non-working position, and time element mechanism controlling said air control means to measure a time interval and when set controlling said air control means to admit said air under pressure to said air motor to operate said tool to said working position and to hold it against said side of said wheel for grinding, and at the end of said interval controlling said air control means to exhaust the air from said motor and thereby permit the return of said tool holder to said non-working position by said biasing means.

6. In a tool grinding machine, a grinding element, a tool holder, a shaft supporting said tool holder and attached thereto for moving it from a non-working position remote from said grinding element to a working position wherein it holds said tool in grinding engagement with said grinding element, a lever attached to said shaft, a spring connected to said lever to bias the shaft and tool holder to said non-working position, a pneumatic motor also connected to said lever and arranged when air under pressure is admitted thereto to operate to move said tool holder to said working position against the force of said spring, and means for controlling the admission of air under pressure to said pneumatic motor.

7. In a tool grinding machine, a grinding element, a tool holder, a shaft supporting said tool holder and for moving it from a non-working position remote from said grinding element to a working position wherein it holds said tool in engagement with said grinding element, means connecting said tool holder with said shaft whereby it moves with the shaft, a lever attached to said shaft, a tension spring having one end connected to said lever, a fixed anchor for the other end of said spring tensioning the spring so that it biases the tool holder to said non-working position, a pneumatic motor having a cylinder one end of which is pivoted at a point adjacent said anchor, and a piston in said cylinder having a rod extending from the other end thereof and connected with said lever, and means for admitting air under pressure to said one end of said cylinder to force the piston outwardly to operate said lever to force said tool holder to its working position against the force of said spring.

STERLING A. OAKLEY.